United States Patent [19]

Sugano

[11] Patent Number: 5,050,460
[45] Date of Patent: Sep. 24, 1991

[54] SHIFT CONTROL SYSTEM FOR AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 391,772

[22] Filed: Aug. 10, 1989

[30] Foreign Application Priority Data

Aug. 11, 1988 [JP] Japan .................................. 63-198937

[51] Int. Cl.⁵ ............................................. F16H 5/60
[52] U.S. Cl. ...................................................... 74/867
[58] Field of Search ................................. 74/867, 868

[56] References Cited

U.S. PATENT DOCUMENTS 4,331,046 5/1982 Leonard et al. ........................ 74/867
4,700,591 10/1987 Yasue et al. ............................ 74/868
4,730,521 3/1988 Hayasaki et al. ..................... 74/867
4,843,920 7/1989 Hayasaki et al,. .................... 74/867

FOREIGN PATENT DOCUMENTS 3017894 11/1980 Fed. Rep. of Germany ........ 74/867
0004654 1/1985 Japan .................................... 74/867
62-62047 3/1987 Japan .

OTHER PUBLICATIONS

Service Manual of Toyota Supra (A340E), Feb. 1986.

Primary Examiner—Allan D. Herrmann
Assistant Examiner—Ryan W. Massey
Attorney, Agent, or Firm—Foley & Lardner

[57] ABSTRACT

A shift control system for an automatic transmission is disclosed, which comprises, in the first embodiment for example, an orifice bypass valve including a spool, a spring and a pilot port. The spool is movable between an interrupting position where a first hydraulic passage is interrupted from a third hydraulic passage, and a connecting position where a first passage is connected with a third passage, and it is pressed to the interrupting position by the spring. The pilot port induces a force by which the spool is pressed in the direction opposite to a force of the spring when the hydraulic fluid is supplied, and it is connected with a fourth hydraulic passage for receiving the hydraulic fluid for operating an overrunning clutch.

7 Claims, 7 Drawing Sheets

FIG. 4

| | C18 | C20 | C22 | C24 | B28 | B26 | OWC 30 | OWC 29 | C32 | B33 | OWC 34 | GEAR RATIO OF OVERALL TRANSMISSION | α1,α2,α3=0.45 | GEAR RATIO OF MAIN GEAR TRAIN | GEAR RATIO OF AUXILIARY GEAR TRAIN |
|---|---|---|---|---|---|---|---|---|---|---|---|---|---|---|---|
| D RANGE | | | | | | | | | | | | | | | |
| 1ST. SPEED | | | ○ | | | | ○ | | | ○ | ○ | $\left(\dfrac{1+\alpha_2}{\alpha_2}\right)(1+\alpha_3)$ | 4.67 | 3.22 | 1.45(LOW) |
| 2ND. SPEED | | ○ | ○ | | ○ | | ○ | | | ○ | ○ | $\left(\dfrac{\alpha_1+\alpha_2+\alpha_1\alpha_2}{\alpha_2(1+\alpha_1)}\right)(1+\alpha_3)$ | 2.45 | 1.69 | 1.45(LOW) |
| 3RD. SPEED | | ○ | ○ | ○ | | | ○ | | | ○ | ○ | $1+\alpha_3$ | 1.45 | 1.00 | 1.45(LOW) |
| 4TH. SPEED | | ○ | ○ | ○ | | | ○ | | ○ | | | 1 | 1.00 | 1.00 | 1.00(HIGH) |
| 5TH. SPEED | | | ○ | ○ | ○ | | | | ○ | | | $\dfrac{1}{1+\alpha_1}$ | 0.69 | 0.69 | 1.00(HIGH) |
| ENGINE BRAKE RUNNING STATE | | | | | | | | | | | | | | | |
| 1ST. SPEED | | | (○) | | | ○ | (○) | (○) | | ○ | (○) | | | | |
| 2ND. SPEED | | | (○) | ○ | | | (○) | | | ○ | (○) | | | | |
| 3RD. SPEED | | ○ | (○) | ○ | | | (○) | | | ○ | (○) | | | | |
| 4TH. SPEED | | ○ | (○) | ○ | | | (○) | | ○ | | | | | | |
| 5TH. SPEED | | ○ | (○) | | ○ | | | | ○ | | | | | | |
| REVERSE | ○ | | | | | ○ | | | | ○ | ○ | $-\dfrac{1+\alpha_3}{\alpha_1}$ | −3.22 | | |

( ) UNRELATED TO POWER TRANSMISSION

SHIFT CONTROL SYSTEM FOR AUTOMATIC TRANSMISSION

BACKGROUND OF THE INVENTION

The present invention relates to a shift control system for an automatic transmission.

An example of a shift control system is included in a hydraulic circuit of an A340E type automatic transmission described in a Service Manual of TOYOTA SUPRA issued in February 1989. The A340E type automatic transmission includes an auxiliary gear train coupled with a 3-speed main gear train. The auxiliary gear train includes a planetary gear set, a one-way clutch, a direct clutch and an OD brake, and is constructed such that the planetary gear set is locked to rotate as a unit when the direct clutch is engaged, and the planetary gear set is in an accelerating state or an over-drive state when the OD brake is engaged. Upon shifting from the 4th speed to the 3rd speed, it is necessary to release the OD brake and engage the direct clutch. Thus, a hydraulic pressure supply to the direct clutch and the OD brake is controlled by a 3-4 shift valve. In this case, the direct clutch should be engaged after the OD brake is completely released. A torque can be transmitted by the oneway clutch in the event that the OD brake becomes disengaged. The direct clutch engaged in this state assures smooth shifting. If the direct clutch is engaged before the OD brake is completely disengaged, there arises an interlock state that two friction elements are simultaneously engaged, causing inconvenience such as a great shift shock. For preventing such inconvenience, an accumulator is disposed to a hydraulic passage through which the direct clutch is subject to a hydraulic pressure. The hydraulic pressure actuating the direct clutch is kept low while a piston of the accumulator strokes so that the direct clutch cannot be engaged. When the stroke of the piston is completed after a predetermined period of time, the hydraulic pressure of the direct clutch is increased. In this manner, since the direct clutch is not engaged during the stroke of the piston, the hydraulic pressure of the OD brake is discharged, thus disengaging the brake. Specifically, the accumulator gives a time lag on engagement of the direct clutch.

With the above-mentioned shift control system, however, the accumulator always gives the time lag on engagement of the direct clutch, so that shifting is appropriately performed during a normal run of a vehicle. However, a shift responsibility is not satisfactory in the event that an engine brake is required. Specifically, the time lag is not regarded as considerable in the event of 4-3 shifting with an increase of depression of an accelerator pedal, while the time lag is regarded as considerable in the event of selecting to 3 range because a driver will expect an immediate occurrence of an engine brake effect.

Therefore, an object of the present invention is to provide a shift control system for an automatic transmission which gives a quick shift responsibility on engine brake.

SUMMARY OF THE INVENTION

There is provided, according to the present invention, a shift control system for an automatic transmission, the automatic transmission having a main gear train and an auxiliary gear train operatively coupled therewith, the main gear train including a forward one-way clutch and an overrunning clutch arranged in parallel therewith, the auxiliary gear train including a first friction element for high gear position and a second friction element for low gear position, the shift control system comprising; a source of hydraulic fluid; a first hydraulic passage; a second hydraulic passage connected with the first friction element, shift valve means for supplying the hydraulic fluid from said source of hydraulic fluid selectively to said first hydraulic passage and second hydraulic passage, a third hydraulic passage connected with the second friction element, a fourth hydraulic passage connected with the overrunning clutch, means for supplying the hydraulic fluid to said fourth hydraulic passage when an engine brake is demanded, and means connected between said third hydraulic passage and said first hydraulic passage for controlling a supply of hydraulic fluid from said first hydraulic passage to said third hydraulic passage in response to the pressure of the hydraulic pressure in said fourth hydraulic passage.

BRIEF DESCRIPTION OF THE DRAWINGS

FIG. 4 is a table illustrating the combination of elements operating in each of the gear positions;

DETAILED DESCRIPTION OF THE INVENTION

Figure 1:
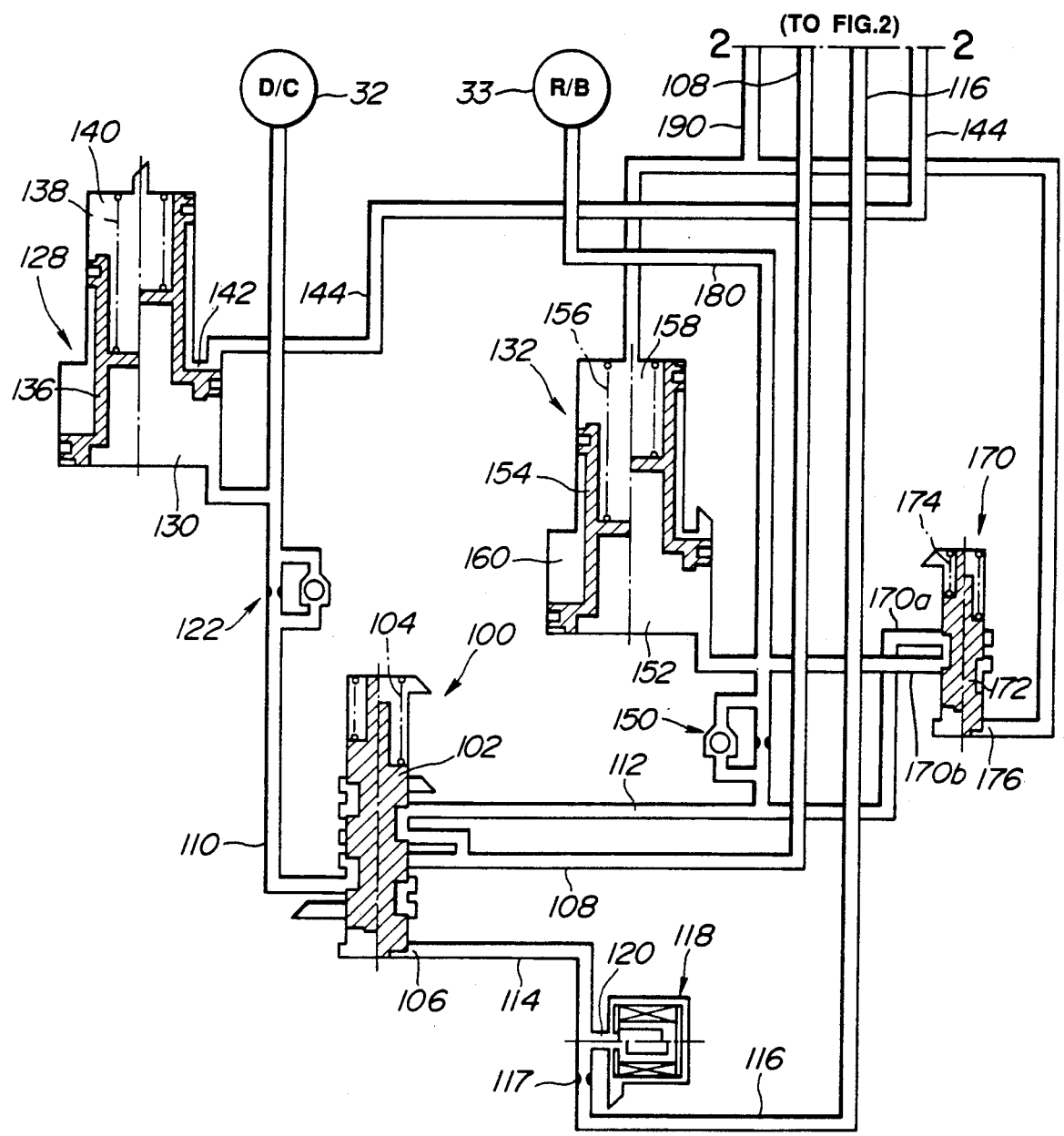
FIG. 1 is a diagrammatic view illustrating a first embodiment of a hydraulic circuit according to the present invention.

Referring to the accompanying drawings, and particularly to FIGS. 1 to 5, a first embodiment will be described. Referring to FIG. 3, there is shown a schematic illustration of a power train of an automatic transmission having five speed positions and one reverse position. This power train comprises a torque converter 10, a main gear train 1, and an auxiliary gear train 2. The torque converter 10 to which a torque is inputted from an engine output shaft 12 incorporates a lock-up clutch 11.

The main gear train 1 includes an input shaft 13 to which a torque is transmitted from the torque converter 10, an intermediate shaft 14 which transmits a driving force to the auxiliary gear train 2, a 1st planetary gear set 15, a 2nd planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The 1st planetary gear set 15 comprises a sun gear S1, an internal gear R1, and a carrier PC1 which supports a pinion gear P1 engaged with the two gears S1 and R1 at the same time. On the other hand, the 2nd planetary gear set 16 comprises a sun gear S2, an internal gear R2, and a carrier PC2 which supports pinion gears P2 engaged with the two gears S2 and R2 at the same time. The carrier PC1 is connectable with the input shaft 13 through the high clutch 20, while the sun gear S1 is connectable with the input gear 13 through the reverse clutch 18. The carrier PC1 is connectable with the internal gear R2 through the forward clutch 22 and the forward one-way clutch 30 connected in series therewith or through the overrunning clutch 24 disposed in parallel to both the forward clutch 22 and the forward one-way clutch 30. The sun gear S2 is always connected with the input shaft 13, while the internal gear R1 and the carrier PC2 are always connected with the intermediate shaft 14. The low and reverse brake 26 is arranged to brake the carrier PC1, while the band brake 28 is arranged to brake the sun gear S1. The low one-way clutch 29 is disposed in a manner to allow a normal rotation of the carrier PC1, i.e., a rotation in the same direction as the engine output shaft 12, and prevent a reverse rotation of the carrier PC1, i.e., a rotation in the opposite direction to the normal rotation.

The auxiliary gear train 2 comprises a 3rd planetary gear set 31, a direct clutch 32, a reduction brake 33, and a reduction one-way clutch 34. The 3rd planetary gear set 31 comprises a sun gear S3, an internal gear R3, and a carrier PC3 which supports pinion gears P3 engaged with the two gears S3 and R3. The internal gear R3 is always connected with the intermediate shaft 14, and it is connectable with the sun gear S3 through the direct clutch 32. The sun gear S3 is adapted to be held stationary to a stationary portion by the reduction brake 33, and it is connected with the reduction one-way clutch 34 disposed in parallel with the reduction brake 33. The reduction one-way clutch 34 is disposed in a manner to allow a normal rotation of the sun gear S3 and prevent a reverse rotation thereof. The carrier PC3 is always connected with an output shaft 35.

In the above-mentioned power train, a rotational state of each of elements S1, S2, S3, R1, R2, R3, PC1, PC2 and PC3 of the planetary gear sets 15, 16 and 31 is variable owing to the operation of the clutches 18, 20, 22, 24 and 32, and the brakes 26, 28 and 33 which are activated in a predetermined pattern, thus changing a revolution speed of the output shaft 35 relative to that of input shaft 13. The five speed positions and one reverse position are established when the clutches 18, 20, 22, 24 and 32, and the brakes 26, 28 and 33 are engaged or applied in the predetermined pattern as shown in FIG. 4. In FIG. 4, cell with circles designate the clutches and brakes in operation, and reference characters α1, α2 and α3 designate ratios of number of teeth of the sun gears S1, S2 and S3 to that of the internal gears R1, R2 and R3, respectively. A gear ratio is a ratio of a revolution speed of the output shaft 35 to that of the input shaft 13. As seen from FIG. 4, the engine brake is activated when the overrunning clutch 24 is engaged, and it can not be obtained when the clutch 24 is disengaged.

For further understanding of the power train, reference should be made to the copending U.S. patent application Ser. No. 07/225,189 filed on July 28, 1988 by Kazuhiko SUGANO, which application has been hereby incorporated by reference.

Figure 2:
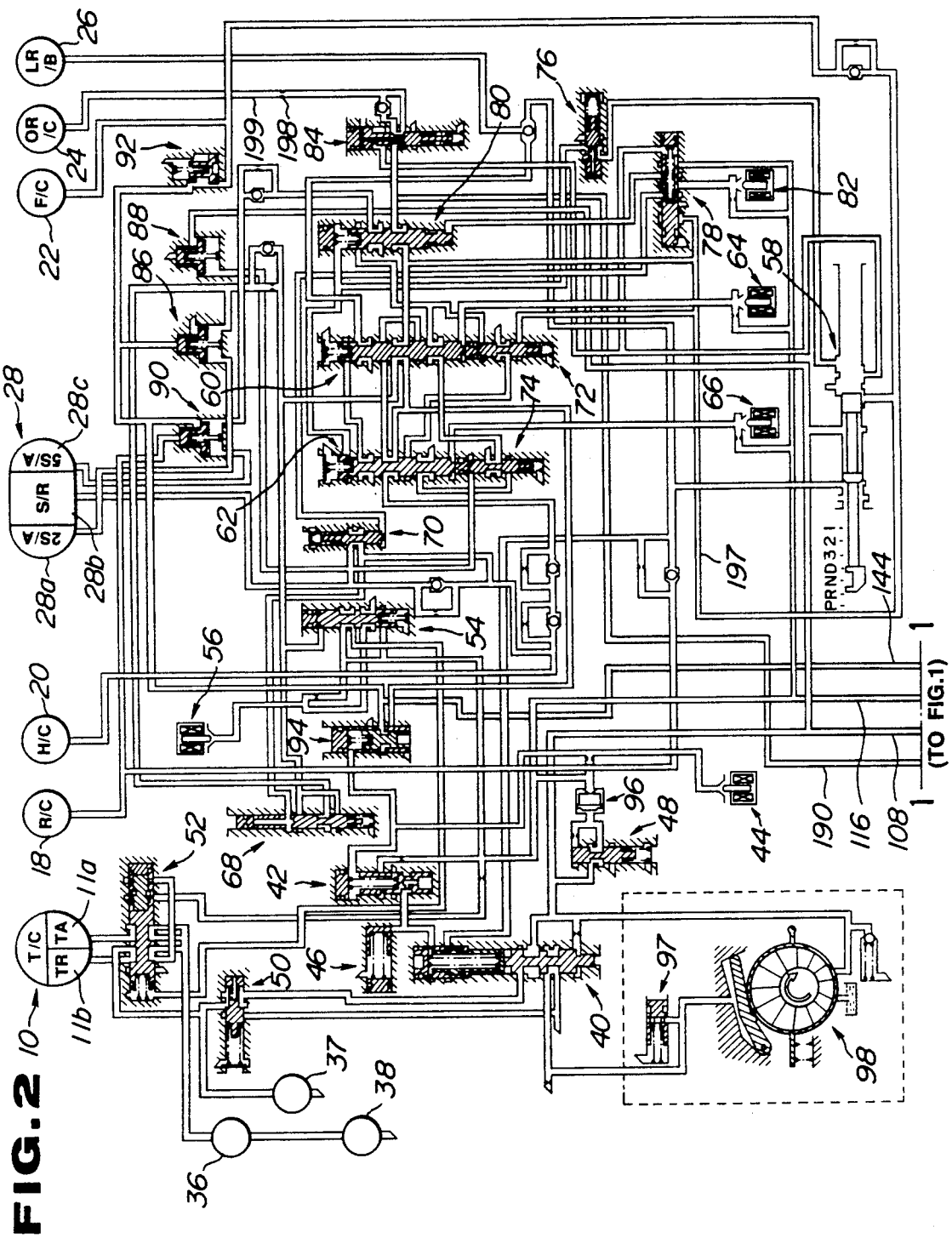
FIG. 2 is a similar view to FIG. 1, illustrating the whole of a hydraulic circuit except a portion shown in FIG. 1.
Figure 3:
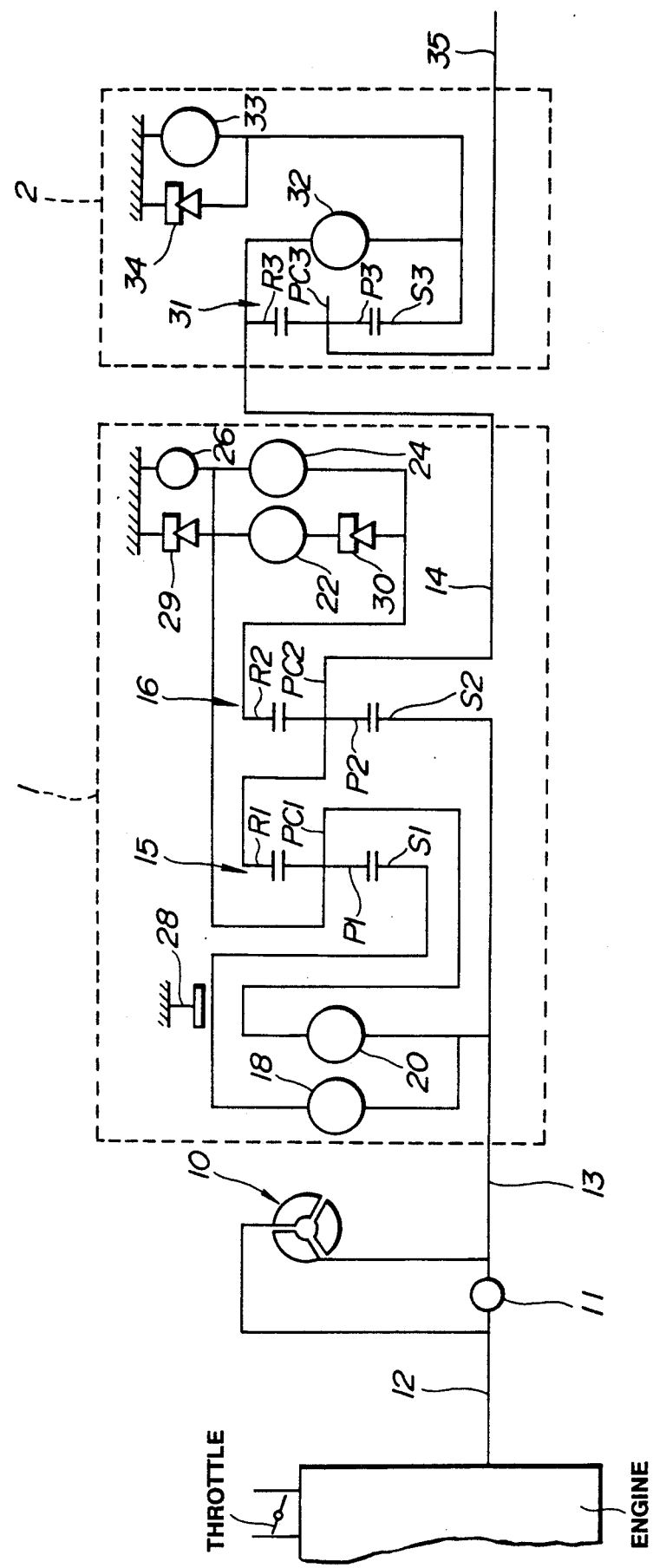
FIG. 3 is a schematic illustration of a power train of an automatic transmission.
Figure 5:
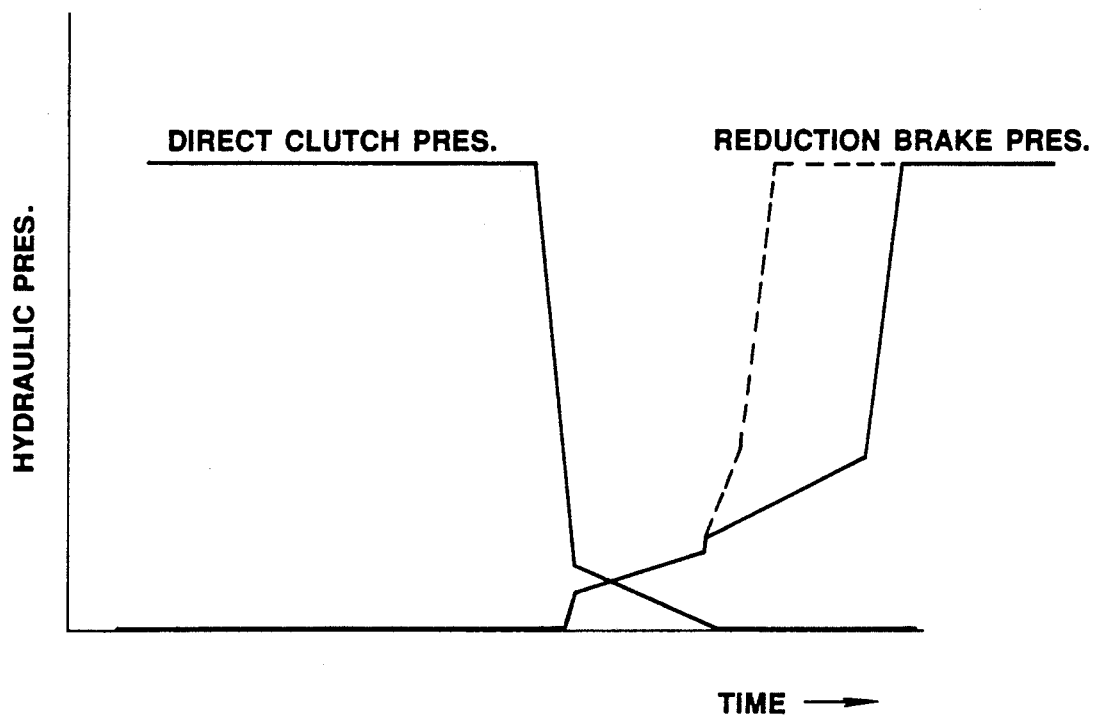
FIG. 5 is a graph illustrating the variations of the hydraulic pressures during shifting.

FIGS. 1 and 2 show portions of a hydraulic circuit which controls the operation of the power train. It is to be noted that a scale of FIG. 2 is reduced more than that of FIG. 1 for convenience's sake. The hydraulic circuit includes a pressure regulator valve 40, a pressure modifier valve 42, a line pressure solenoid 44, a modifier pressure accumulator 46, a pilot valve 48, a torque converter relief valve 50, a lock-up control valve 52, a 1st shuttle valve 54, a lock-up solenoid 56, a manual valve 58, a 1st shift valve 60, a 2nd shift valve 62, a 1st shift solenoid 64, a 2nd shift solenoid 66, a servo charger valve 68, a 3-2 timing valve 70, a 5-2 relay valve 72, a 5-2 sequence valve 74, a 1st reducing valve 76, a 2nd shuttle valve 78, an overrunning clutch control valve 80, an overrunning clutch solenoid 82, an overrunning clutch reducing valve 84, a 1-2 accumulator 86, a 2-3 accumulator 88, a 4-5 accumulator 90, a N-D accumulator 92, an accumulator control valve 94, a filter 96, a shift valve 100 for the auxiliary gear train 2, a shift solenoid 118 for the auxiliary gear train 2, a reduction brake accumulator 132, a direct clutch accumulator 128, and an orifice bypass valve 170. These are interconnected as shown in FIGS. 1 and 2, and are connected to the torque converter 10 which is formed with an apply chamber 11a and a release chamber 11b of the lock-up clutch 11. The lock-up clutch 11 is disengaged when the release chamber 11b is subject to a hydraulic pressure and engaged when the apply chamber 11a is subject to the hydraulic pressure. These are connected also to the forward clutch 22, the high clutch 20, the band brake 28 which is formed with an apply chamber for the 2nd speed position 28a, a release chamber for the 3rd and 4th speed positions 28b and an apply chamber for the 5th speed position 28c are formed, the reverse clutch 18, the low and reverse brake 26, the overrunning clutch 24, the direct clutch 32, and the reduction brake 33. These are further connected to a variable delivery vane-type oil pump 97 with a feed-back accumulator 97, an oil cooler 36, a front lubricating circuit 37, and a rear lubricating circuit 38 as shown in FIGS. 1 and 2. A detailed description of the hydraulic circuit including these valves is omitted, however, it may be deduced by making a reference to the U.S. Pat. No. 4,730,521 issued to Hayasaki et al., since it discloses a similar hydraulic circuit.

The overrunning clutch control valve 80 is switched and controlled by the overrunning clutch solenoid 82 to control a connection between the hydraulic passage 197 to which the hydraulic pressure is always supplied on a forward run and the hydraulic passage 190. Specifically, the hydraulic passage 197 is connected with the hydraulic passage 190 when the overrunning clutch solenoid 82 is in OFF the, state and the passage 197 is disconnected with the passage 190 when the solenoid 82 is ON state. The hydraulic passage 190 is in the connected with the overrunning clutch 24 through the overrunning clutch reduction valve 84 and the hydraulic passage 199. Specifically, the overrunning clutch 24 is engaged when the overrunning clutch solenoid 82 is in the OFF state. The solenoid 82 is OFF when a power mode is selected in D range or when the throttle valve is almost completely closed in the 3 or 2 range or when the 1 range is selected.

FIG. 1 shows a portion of the hydraulic circuit which directly relates to the present invention.

The shift valve 100 for the auxiliary gear train 2 comprises a spool 102 and a spring 104. The spool 102 is movable between an up position (or 2nd position) illustrated by the left half thereof as viewed in FIG. 1 and a down position (or 1st position) illustrated by the right half thereof as viewed in FIG. 1 on a dynamic relation between a force of a hydraulic fluid at a port 106 and that of the spring 104. When the spool 102 is at the up position, a line pressure hydraulic passage 108 is connected with a 2nd hydraulic passage 110 and a 1st hydraulic passage 112 is drained. On the other hand, when the spool 102 is at the down position, the line pressure passage 108 is connected with the 1st hydraulic passage 112 and the 2nd hydraulic passage 110 is drained. The port 106 is subject to a hydraulic pressure of a hydraulic passage 114. The passage 114 is connected to a hydraulic passage 116 to which a constant pilot pressure is always provided from the pilot valve 48 through an orifice 117. The hydraulic pressure of the hydraulic passage 114 is regulable by the shift solenoid 118 for the auxiliary gear train 2. Specifically, when the shift solenoid 118 closes an opening 120 of the hydraulic passage 114, the passage 114 is subject to the pilot pressure in a similar manner to the hydraulic passage 116. On the other hand, when the opening 120 is opened, the hydraulic passage 114 is drained.

The 2nd hydraulic passage 110 is connected to the direct clutch 32. A one-way orifice 122 is disposed at the middle of the 2nd hydraulic passage 110. The 2nd passage 110 is connected to a working pressure chamber 130 of the direct clutch accumulator 128 at its portion nearer to the direct clutch 32 than the one-way orifice 122. The direct clutch accumulator 128 comprises a stepped piston 136 and a spring 138. The working pressure chamber 130 is formed at a large diameter portion of the piston 136, while a hydraulic chamber 140 is formed at a small diameter portion of the piston 136 and is drained. A hydraulic chamber 142 disposed between the large and small diameter portions of the piston 136 is connected to a hydraulic passage 144. The hydraulic pressure of the passage 144 is regulable by the accumulator valve 94.

The 1st hydraulic passage 112 is connectd to the 3rd hydraulic passage 180 through the one-way orifice 150. The 3rd hydraulic passage 180 is connected to the reduction brake 33 and the working pressure chamber 152 of the reduction brake accumulator 132. The reduction brake accumulator 132 comprises a stepped piston 154 and a spring 156. The working pressure chamber 152 is formed at a large diameter portion of the piston 154, while a hydraulic chamber 158 is formed at a small diameter portion of the piston 154 and is connected to the hydraulic passage 190. A hydraulic chamber 160 between the large and small diameter portions of the piston 154 is drained.

The orifice bypass valve 170 is connected with the 1st hydraulic passage 112 and also with the 3rd hydraulic passage 180 in parallel to the one-way orifice 150 so as to provide a bypass passage 170a and 170b. It comprises a spool 172 and a spring 174. The spool 172 is movable between an interrupting position as illustrated by the right half thereof as viewed in FIG. 1 where the bypass passage 170a and 170b is closed, and a connecting position as illustrated by the left half thereof as viewed in FIG. 1, where the the bypass passage 170a and 170b is opened, on a dynamic relation between a force of the spring 174 and that of a hydraulic fluid of the hydraulic passage 190 at a pilot port 176. That is, the spool 172 is at the interrupting position when the pilot port 176 is not subject to the hydraulic pressure, and it is the connecting position when the port 176 is subject to the hydraulic pressure. The hydraulic passage 190 is connected, via the overrunning clutch reduction valve 84, to the overrunning clutch 24 which is engaged when the engine brake is required or demanded by placing the manual valve 58 at 3 range, for example.

The operation of this embodiment is as follows:

First, a description with regard to the D range will be made. At the 4th or 5th speed position, the spool 102 of the shift valve 100 for the auxiliary gear train 2 is at the up position by the operation of the shift solenoid 118 for the auxiliary gear train 2. As a result, the line pressure hydraulic passage 108 is connected with the 2nd hydraulic passage 110, thus the direct clutch 32 is subject to the line pressure. On the other hand, the 1st hydraulic passage 112 is drained by the shift valve 100 so that the reduction brake 33 is kept disengaged. Thus, since the direct clutch 32 is engaged and the reduction brake 33 is disengaged, the auxiliary gear train 2 is in a direct-coupled state or high, consequently at the 4th or 5th speed position as seen from a table of FIG. 4.

When the auxiliary gear train 2 is shifted from high to low, the following action is carried out: By the operation of the shift solenoid 118 for the auxiliary gear train 2, the spool 102 of the shift valve 100 for the auxiliary gear train 2 is shifted to the down position, and the 2nd hydraulic passage 110 is drained, thus the 1st hydraulic passage 112 is subject to the line pressure. The 2nd hydraulic passage 110 is drained so that the direct clutch 32 is disengaged. On the other hand, since the spool 172 of the orifice bypass valve 170 is at the interrupting position, the line pressure in the 1st hydraulic passage 112 is supplied to the working pressure chamber 152 of the reduction brake accumulator 132 only through the one-way orifice 150. As a result, the piston 154 is urged against the to stroke. While the piston 154 strokes, the hydraulic pressure in the working pressure chamber 152 assumes a low level that is determined in response to the force of the spring 156. The reduction brake 33 is subject to this low hydraulic pressure so that the brake 33 is not yet completely engaged during the stroke of the piston 154. Upon completion of the stroke of the piston 154, the hydraulic pressure increases quickly causing the brake 33 to be completely engaged. The variations of the hydraulic pressures of the direct clutch 32 and the reduction brake 33 during this shifting are illustrated by fully drawn lines in FIG. 5. As seen from this, after the hydraulic pressure of the direct clutch 32 is low enough to disengage the clutch 32, the hydraulic pressure of the reduction brake 33 begins to increase.

Even if the reduction brake 33 is engaged at a delayed timing during the above-mentioned shifting, there arises no racing of an engine. That is, the reduction one-way clutch 34 is disposed so that, as a torque of the direct clutch 32 is decreased, the decreased torque is automatically compensated by the reduction one-way clutch 34, allowing the smooth shifting. The reduction brake 33 is completely engaged after the part of the torque is changed from the direct clutch 32 to the reduction one-way clutch 34. Thus, it is understood that a shift timing is easy to control due to the reduction one-way clutch 34.

Next, a description with regard to 3 range will be made. When the manual valve 58 is shifted from D range to 3 range in the event that the auxiliary gear train 2 is at high, the overrunning clutch solenoid 82 is turned ON, switching the overrunning clutch control valve 80. Thus, the 3 range pressure is outputted to the hydraulic passage 190, which is supplied to the pilot port 176 of the orifice bypass valve 170. As a result, the spool 172 is urged to move against the spring 174 to assume the connecting position. In this state, if the shift valve 100 for the auxiliary gear train 2 is shifted from the up position to the down position owing to the operation of the shift solenoid 118 for the auxiliary gear train 2, the hydraulic pressure of the direct clutch 32 begins to be discharged in a similar manner to the D range, and the 1st hydraulic passage 112 is subject to the hydraulic pressure. In this case, since the 1st hydraulic passage 112 is connected with the 3rd hydraulic passage 180 through the bypass passage 170a and 170b which is opened by the orifice bypass valve 170, the hydraulic fluid flows rapidly to the 3rd hydraulic passage 180, and the piston 154 of the reduction brake accumulator 132 strokes quickly, causing a rapid increase of the hydraulic pressure supplied to the reduction brake 33. As a result, the hydraulic pressure varies as indicated by dotted line in FIG. 5 and the reduction brake 33 begins to be engaged immediately by the higher pressure, reducing a time required for shifting. Thus, shifting to the 3rd speed position is performed quickly, resulting in quick shift to the engine brake running state.

Upon 5-3 shifting, the overrunning clutch 24 should be engaged subsequently to the engagement of the reduction brake 33. For this purpose, the hydraulic passage 199 is provided with an orifice 198, which allows firstly shifting from the high gear position to the low gear position of the auxiliary gear train 2 and then shifting of the main gear train 1 upon 5-3 shifting. Accordingly, a torque capacity in the final stage of shifting is determined by the overrunning clutch 24. On the other hand, the torque capacity upon 4-3 shifting is determined by the reduction brake 33. Shifting performance of 5-3 shifting therefore can be set independently to that of 4-3 shifting.

Figure 6:
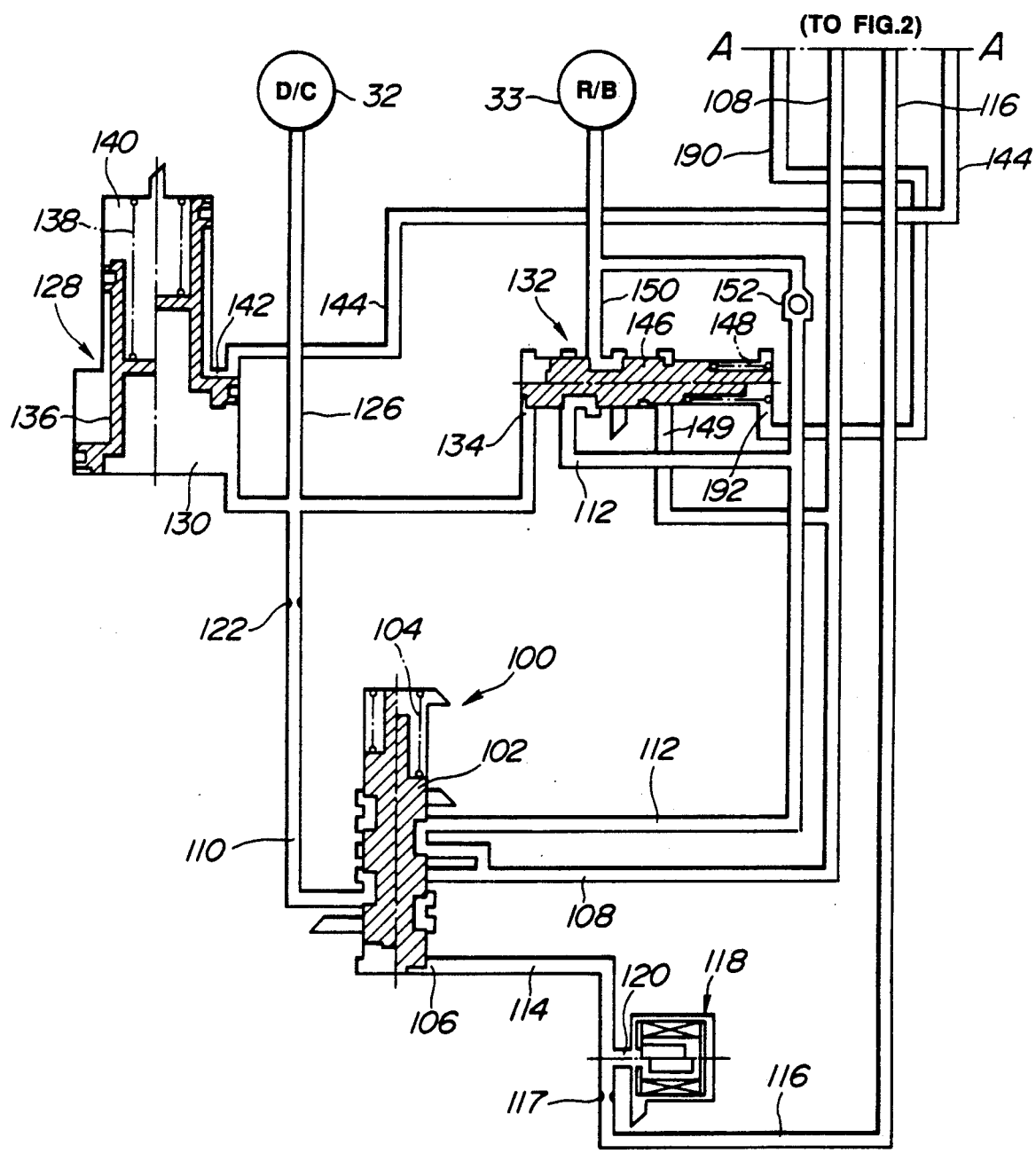
FIG. 6 is a similar view to FIG. 1 illustrating a portion of a second embodiment.
Figure 7:
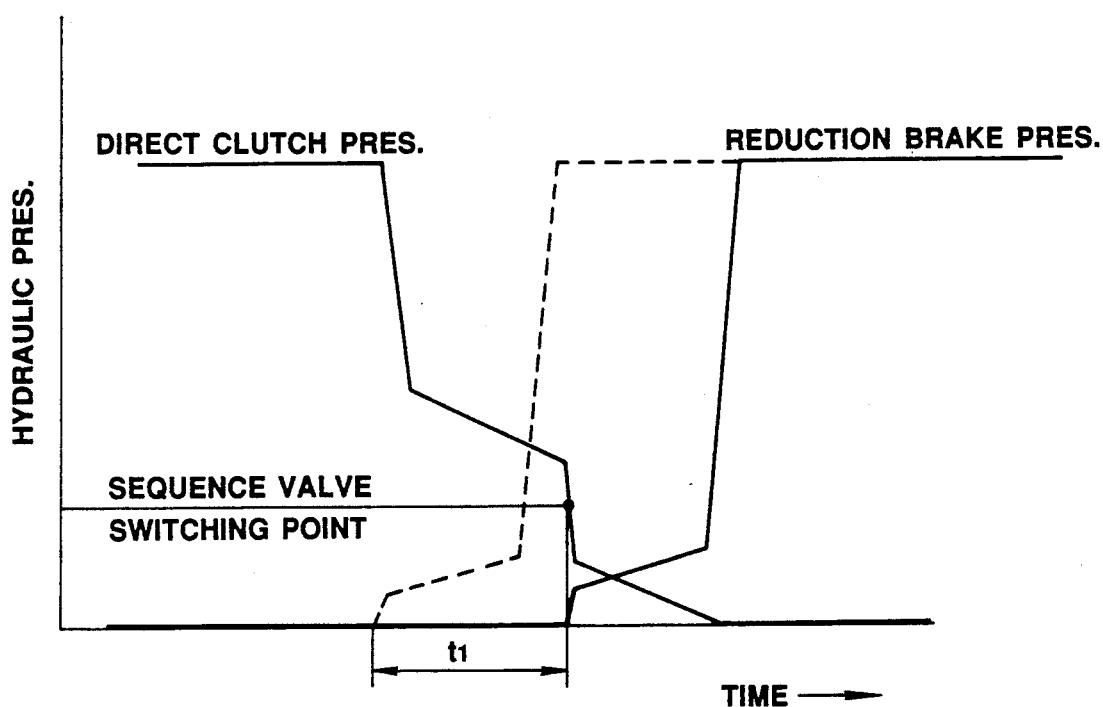
FIG. 7 is a similar view to FIG. 5 illustrating the variations of the hydraulic pressures of the second embodiment during shifting.

Referring now to FIGS. 6 and 7, a second embodiment is described. Referring to FIGS. 6 and 7, it will be to be noted that the second embodiment is substantially similar to the first embodiment and that only a portion shown in FIG. 6 is substituted for that shown in FIG. 1.

A shift valve 100 for the auxiliary gear train 2 comprises a spool 102 and a spring 104. The spool 102 is movable between an up position (or 2nd position) illustrated by the left half therof as viewed in FIG. 6, and a down position or (1st position) illustrated by the right half thereof as viewed in FIG. 6 on a dynamic relation between a force of a hydraulic fluid at a port 106 and that of the spring 104. When the spool 102 is at the up position, a line pressure hydraulic passage 108 is connected with a 2nd hydraulic passage 110 and a 1st hydraulic passage 112 is drained. On the other hand, when the spool 102 is at the down position, the line pressure passage 108 is connected with the 1st hydraulic passage 112 and the 2nd hydraulic passage 110 is drained. The port 106 is subject to a hydraulic pressure of a hydraulic passage 114. The passage 114 is connected to a hydraulic passage 116 to which a constant pilot pressure is always provided from the pilot valve 48 through an orifice 117. The hydraulic pressure of the hydraulic passage 114 is regulable by the shift solenoid 118 for the auxiliary gear train 2. Specifically, when the shift solenoid 118 closes an opening 120 of the hydraulic passage 114, the passage 114 is subject to the pilot pressure in a similar manner to the hydraulic passage 116. On the other hand, when the opening 120 is opened, the hydraulic passage 114 is drained.

The 2nd hydraulic passage 110 is connected to a 4th hydraulic passage 126 through an orifice 122. The 4th hydraulic passage 126 is connected to the direct clutch 32, and is also connected to a working pressure chamber 130 of the direct clutch accumulator 128 and a pilot port 134 of a 4-3 sequence valve 132. The direct clutch accumulator 128 comprises a stepped piston 136 and a spring 138.

The working pressure chamber 130 is formed at a large diameter portion of the piston 136, while a hydraulic chamber 140 is formed at a small diameter portion of the piston 136 is drained. A hydraulic chamber 142 disposed between the large and small diameter portions of the piston 136 is connected to a hydraulic passage 144. The hydraulic pressure of the passage 144 is regulable by the acclmulator valve 94.

The 4-3 sequence valve 132 comprises a spool 146 and a spring 148. The spool 146 is movable between a discharge position illustrated by the upper half thereof as viewed in FIG. 6 and a connecting position illustrated by the lower half thereof as viewed in FIG. 6, on a dynamic relation between a force of the hydraulic fluid at the pilot port 134 and a combined force of the spring 148, the line pressure at a port 149 and the hydraulic fluid at an overrule port 192. The overrule port 192 is connected to the hydraulic passage 190 which is connected with the overrunning clutch 24. When the spool 146 is at the discharge position, the 3rd hydraulic passage 150 is drained. On the other hand, when the spool 146 is at the connecting position, the 3rd hydraulic passage 150 is connected with the 1st hydraulic passage 112. The 3rd hydraulic passage 150 is connected with a reduction brake 33. An one-way valve 152 is arranged between the 3rd hydraulic passage 150 and the 1st hydraulic passage 112. The one-way valve 152 is disposed in a manner to allow a flow from the 3rd passage 150 to the 1st passage 112 and prevent a reverse flow thereof.

The operation of this embodiment is as follows:

First, a description with regard to the D range will be made. At the 4th or 5th speed position, the spool 102 of the shift valve 100 for the auxiliary gear train 2 is at the up position by the operation of the shift solenoid 118 for the auxiliary gear train 2. As a result, the line pressure hydraulic passage 108 is connected with the 2nd hydraulic passage 110, thus the direct clutch 32 is subject to the line pressure through the orifice 122. On the other hand, the 1st hydraulic passage 112 is drained by the shift valve 100 so that the 3rd hydraulic passage 150 is drained through the one-way valve 152. In that event, the spool 146 of the 4-3 sequence valve 132 is at the discharge position so that the 3rd passage 150 is also drained by the 4-3 sequence valve 132. As a result, the reduction brake 33 is kept disengaged. Thus, since the direct clutch 32 is engaged and the reduction brake 33 is disengaged, the auxiliary gear train 2 is in a direct-coupled state or high, consequently at the 4th or 5th speed position as seen from the table of FIG. 4.

When the auxiliary gear train 2 is shifted from high to low, the following action is carried out: By the operation of the shift solenoid 118 for the auxiliary gear train 2, the spool 102 of the shift valve 100 for the auxiliary gear train 2 is shifted to the down position, and the 2nd hydraulic passage 110 is drained, thus the 1st hydraulic passage 112 is subject to the line pressure. The 2nd hydraulic passage 110 is drained so that the 4th hydraulic passage 126 is also drained through the orifice 122. Since the 4th hydraulic passage 126 is connected with the working pressure chamber 130 of the accumulator 128, the piston 136 is urged to stroke from a position illustrated by the right half thereof as viewed in FIG. 6 to that illustrated by the left half thereof as viewed in FIG. 6 as the hydraulic fluid of the 4th passage 126 is drained. As a result, the hydraulic pressure of the 4th hydraulic passage 126 decreases gradually in balancing with a force of the spring 138 and that of the hydraulic fluid at the hydraulic chamber 142. The hydraulic pressure of the 4th hydraulic passage 126 is also supplied to the the pilot port 134 of the 4-3 sequence valve 132. During a stroke of the piston 136, a force at the pilot port 134 is larger than that of a combined force of the spring 148 and the line pressure at the port 149 in that event, the manual valve 58 is placed at D range or in a non-engine brake state so that there is no hydraulic pressure at the port 192. Thus, and thus the spool 146 is kept at the discharge position illustrated by the upper half thereof as viewed in FIG. 1. Upon completion of the stroke of the piston 136 of the accumulator 128, the hydraulic pressure of the 4th hydraulic passage 126 decreases quickly, and thus the direct clutch 32 is completely disengaged. At the same time, the hydraulic pressure of the pilot port 134 of the 4-3 sequence valve 132 decreases so that the spool 146 is urged to move to the connecting position illustrated by the lower half thereof as viewed in FIG. 1. As a result, the 1st hydraulic passage 112 is connected with the 3rd hydraulic passage 150, and the line pressure of the 1st passage 112 begins to be supplied to the reduction brake 33. As the hydraulic pressure at the reduction brake 33 increases, the reduction brake 33 is engaged. The variations of the hydraulic pressures of the direct clutch 32 and the reduction brake 33 during this shifting are illustrated by fully drawn line in FIG. 7. As seen from this, after the hydraulic pressure of the direct clutch 32 is low enough to disengage the clutch 32, the hydraulic pressure of the reduction brake 33 begins to increase.

Even if the reduction brake 33 is engaged at a delayed timing during the above-mentioned shifting, there arises no racing of an engine. That is, the reduction one-way clutch 34 is disposed so that, as a torque of the direct clutch 32 is decreased, the decreased torque is automatically compensated by the reduction one-way clutch 34, allowing the smooth shifting. The reduction brake 33 is completely engaged after the part of the torque is changed from the direct clutch 32 to the reduction one-way clutch 34. Thus, it is understood that a shift timing is easy to regulate due to the reduction one-way clutch 34.

Next, a description with regard to 3 range will be made. When the manual valve 58 is selected from D range to 3 range in the event that the auxiliary gear train 2 is at high position, the overrunning clutch solenoid 82 is turned ON, switching the overrunning clutch control valve 80. Thus, the 3 range pressure is outputted to the hydraulic passage 190, which is supplied to the overrule port 192 of the 4-3 sequence valve 132. As a result, a force operating on the spool 146 to the left as viewed in FIG. 6 increases, and the spool 146 is urged to move to the connecting position independent of the hydraulic pressure of the pilot port 134. At the same time, the shift valve 100 for the auxiliary gear train 2 is also urged to move from the up position to the down position by the operation of the shift solenoid 118 for the auxiliary gear train 2. Therefore, discharge of the hydraulic fluid from the direct clutch 32 and supply of the hydraulic fluid to the reduction brake 33 is performed at the same time. As a result, the hydraulic pressure varies as illustrated by dotted line in FIG. 7 and a time required for shifting is reduced by $t_1$ as compared with that at D range. Thus, shifting to the 3rd speed position is performed quickly, resulting in a quick shift to the engine brake running state.

What is claimed is:
1. In an automatic transmission:
a main gear train including a forward one-way clutch and an overrunning clutch arranged in parallel therewith;
an auxiliary gear train operatively coupled with said main gear train, said auxiliary gear train including a first friction element for high gear position and a second friction element for low gear position;
a source of hydraulic fluid;
a first hydraulic passage;
a second hydraulic passage connected with said first friction element;
shift valve means for supplying the hydraulic fluid from said source of hydraulic fluid selectively to said first hydraulic passage and said second hydraulic passage;
a third hydraulic passage connected with said second friction element;
a fourth hydraulic passage connected with said overrunning clutch;
means for supplying the hydraulic fluid to said fourth hydraulic passage when an engine brake is demanded; and
means connected between said third hydraulic passage and said first hydraulic passage for controlling supply of hydraulic fluid from said first hydraulic passage to said third hydraulic passage in response to the pressure of the hydraulic pressure in said fourth hydraulic passage.

2. A shift control system for an automatic transmission, the automatic transmission having a main gear train and an auxiliary gear train operatively coupled therewith, the main gear train including a forward one-way clutch and an overrunning clutch arranged in parallel therewith, the auxiliary gear train including a first friction element for high gear position and a second friction element for low gear position, the shift control system comprising:
a source of hydraulic fluid;
a first hydraulic passage;
a second hydraulic passage connected with the first friction element;
shift valve means for supplying the hydraulic fluid from said source of hydraulic fluid selectively to said first hydraulic passage and second hydraulic passage;
a third hydraulic passage connected with the second friction element and said first passage through an orifice;
a fourth hydraulic passage connected with the overrunning clutch;
means for supplying the hydraulic fluid to said fourth hydraulic passage when an engine brake is demanded;
an accumulator including a first pressure chamber and a second pressure chamber, said first pressure chamber being connected with said third hydraulic passage, said second pressure chamber being connected with said forth hydraulic passage;
said shift valve means including a spool movable between a first position where the hydraulic fluid is supplied to said first hydraulic passage and hydraulic fluid is discharged from said second hydraulic passage, and a second position where the hydraulic fluid is supplied to said second hydraulic passage and hydraulic fluid is discharged from said first hydraulic passage;

an one-way orifice connected between said first hydraulic passage and said third hydraulic passage;

an orifice bypass valve, said orifice bypass valve including a spool, a spring and a pilot port, said spool of said orifice valve being movable to a predetermined position where a bypass passage is opened which interconnects said first and third hydraulic passages bypassing said one-way orifice, said pilot port inducing a force by which said spool is urged to move against said spring to said predetermined position when the hydraulic fluid is supplied, said pilot port being connected with said fourth hydraulic passage.

3. A shift control system as calimed in claim 2, wherein said auxiliary gear train includes a planetary gear set having an internal gear, a pinion carrier and a sun gear.

4. A shift control system as claimed in claim 2, wherein said first friction element includes a reduction brake, and said second friction element includes a direct clutch.

5. A shift control system as claimed in claim 2, wherein said supplying means include a manual valve having a predetermined range position where said third hydraulic passage is connected with said source of the hydraulic fluid.

6. A shift control system as claimed in claim 3, wherein said auxiliary gear train includes an input shaft connected with said internal gear, and an output shaft connected with said pinion carrier.

7. A shift control system as claimed in claim 4, wherein said reduction brake can hold stationary said sun gear, and said direct clutch can connect two desired of said internal gear, said pinion carrier, and said sun gear with each other.

* * * * *